(12) United States Patent
Purfuerst et al.

(10) Patent No.: US 8,882,320 B2
(45) Date of Patent: Nov. 11, 2014

(54) CONNECTOR

(75) Inventors: Joerg Roberto Purfuerst, Kürten (DE);
Norbert Schumann, Kürten (DE);
Thomas Keller, Neuss (DE); Werner Schwarz, Leverkusen (DE); David M. Rudek, Düsseldorf (DE); Eric Schmuck, Düsseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 88 days.

(21) Appl. No.: 13/496,018

(22) PCT Filed: Sep. 17, 2010

(86) PCT No.: PCT/US2010/049205
§ 371 (c)(1),
(2), (4) Date: Mar. 14, 2012

(87) PCT Pub. No.: WO2011/035081
PCT Pub. Date: Mar. 24, 2011

(65) Prior Publication Data
US 2012/0170304 A1    Jul. 5, 2012

(30) Foreign Application Priority Data

Sep. 18, 2009    (EP) .................................... 09170759

(51) Int. Cl.
*G02B 6/24*    (2006.01)
*F21V 8/00*    (2006.01)

(52) U.S. Cl.
CPC .............. *G02B 6/0006* (2013.01); *G02B 6/001* (2013.01)
USPC ................ 362/581; 362/555; 385/31; 385/39

(58) Field of Classification Search
USPC ............ 362/238, 239, 249.03, 555, 558, 581, 362/634; 385/31, 32, 39, 50
See application file for complete search history.

(56) References Cited

U.S. PATENT DOCUMENTS 5,071,118 A * 12/1991 Barnett ........................... 482/82
5,170,454 A * 12/1992 Kanai .............................. 385/88

(Continued)

FOREIGN PATENT DOCUMENTS

JP    S58-97056    6/1983
JP    H11-66929    3/1999

(Continued)

OTHER PUBLICATIONS

PCT International Search Report for PCT/US2010/049205, mailed Feb. 24, 2011.

*Primary Examiner* — Thomas M Sember
(74) *Attorney, Agent, or Firm* — Robert S. Moshrefzadeh

(57) ABSTRACT

A connector adapted for use in an illumination system comprising at least one optical element, such as an optical fiber, is disclosed. The connector comprises a housing dimensioned so that internally it retains at least one end portion of at least one optical element, and externally substantially follows the shape of the end portion(s) of the optical element(s). This forms a join between the ends of the optical element(s). A light source is also contained within the housing and positioned so as to illuminate the end portions of at least one optical element. Electrical connection means adapted to connect the light source to an external power supply are provided. The electrical connection means being moveable relative to the housing. The electrical connection means may be carried by a flexible substrate, or may be formed by slideable contacts within a light guide rail.

20 Claims, 3 Drawing Sheets

(56) References Cited

U.S. PATENT DOCUMENTS

| | | | |
|---|---|---|---|
| 5,432,876 | A | 7/1995 | Appeldorn |
| 5,833,358 | A * | 11/1998 | Patik .............................. 362/391 |
| 5,845,038 | A | 12/1998 | Lundin |
| 6,107,916 | A | 8/2000 | Beck |
| 6,123,442 | A * | 9/2000 | Freier et al. ................... 362/559 |
| 6,510,267 | B1 * | 1/2003 | Hulse et al. ...................... 385/50 |
| 6,910,783 | B2 | 6/2005 | Mezei |
| 7,074,463 | B2 | 7/2006 | Jones |
| 7,163,305 | B2 * | 1/2007 | Bienick ............................ 362/92 |
| 7,179,513 | B2 | 2/2007 | Jones |
| 7,512,300 | B2 * | 3/2009 | Robertson et al. ............ 385/101 |
| 8,206,001 | B2 * | 6/2012 | Piepgras et al. .............. 362/149 |
| 8,574,001 | B2 * | 11/2013 | Lee ................................ 439/490 |
| 2004/0066659 | A1 | 4/2004 | Mezei et al. |
| 2005/0286260 | A1 | 12/2005 | Liu |
| 2008/0198624 | A1 * | 8/2008 | Lundin et al. .................. 362/615 |
| 2010/0142226 | A1 | 6/2010 | Vogt |
| 2011/0116286 | A1 * | 5/2011 | Rudek et al. ................... 362/615 |
| 2012/0020107 | A1 | 1/2012 | Lundin et al. |
| 2012/0170305 | A1 * | 7/2012 | Rudek et al. ................... 362/581 |

FOREIGN PATENT DOCUMENTS

| | | |
|---|---|---|
| JP | 2001-283601 | 10/2001 |
| JP | 3118254 | 1/2006 |
| WO | WO 2009134572 A1 * | 11/2009 |
| WO | WO 2010063625 A1 * | 6/2010 |

* cited by examiner

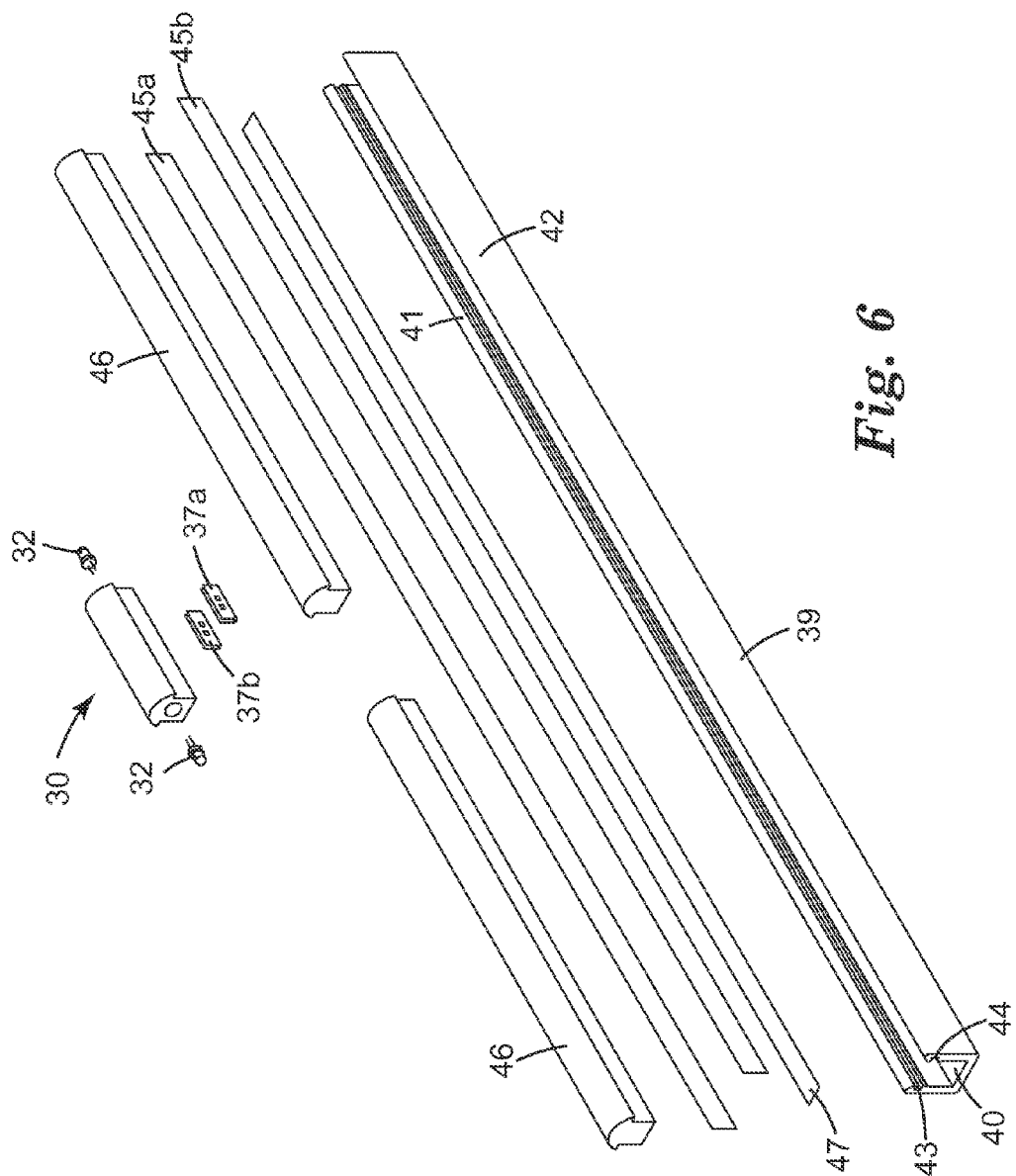

CONNECTOR

CROSS REFERENCE TO RELATED APPLICATIONS

This application is a national stage filing under 35 U.S.C. 371 of PCT/US2010/049205, field Sep. 17, 2010, which claims priority to European Application No. 09170759.6, filed Sep. 18, 2009, the disclosures of which are incorporated by reference in their entireties herein.

The present invention relates to a connector adapted for use in an illumination system, in particular, in an illumination system comprising an optical element, such as an optical fibre.

Optical elements, such as optical fibres and optical films, can be used in a variety of both functional and decorative lighting applications. Lighting used to highlight an object or area to increase conspicuousness can be considered to be functional in nature, whereas lighting used purely for aesthetic reasons can be considered to be decorative in nature.

Illumination of optical fibres and optical films is typically provided by at least one light source, such as a light emitting diode (LED). Generally optical fibres comprise a core and a cladding layer, with total internal reflection occurring at the boundary or interface between the core and the cladding layer. Light emitted from the light source is transmitted along the length of the fibre by means of this total internal reflection, and so may be viewed from an exposed end of the optical fibre. Alternatively, light may be viewed along the length of the optical fibre if means are provided to either change the angle of internal reflection to below the critical angle, such that light is emitted laterally to the optical fibre, or to maximise or reinforce the amount of light emitted from a fibre where a portion of the light transmitted along the length of the fibre is already visible. Such fibres emit light along their length due to imperfections within the fibre, for example in either the core or the cladding layer, or because the core/cladding interface contains imperfections. Viewing light along the length of the fibre may be achieved in a number of ways, depending on the lighting effect required.

For example, EP 0 594 089 discloses the use of a plurality of notches cut into the outer surface of an optical fibre exhibiting total internal reflection along at least a portion of its length to create additional reflecting surfaces. Light striking each of these reflecting surfaces is reflected out of the optical fibre, creating a light emission point. Typically, the reflecting surfaces have a cross-sectional area which is smaller than the cross-sectional area of the fibre in which the notch forming the surface is made. Suitable notches include "V"-shaped and undercut notches, as well as notches having a quarter cylindrical shape. The notches may be cut in the surface of the fibre so as to be perpendicular to an axis running centrally along the length of the fibre, or so as to be inclined at an angle to such an axis. A single row of notches may be provided, or, as discussed in WO98/33008, two rows of notches may overlap, giving a pattern where adjacent notches are offset from each other. Each notch produces illumination corresponding to the size and position of the notch itself.

An alternative approach is to use a fibre where a portion of the light transmitted along its length is already visible, and to combine the fibre with, for example, a diffuse reflecting surface, as disclosed in WO99/22174. Suitable diffuse reflecting surfaces include sheet materials, such as microvoided and mircoporous sheet materials, that can be wrapped around a portion of the circumference of an optical fibre along at least part of its visible length. Using a diffuse reflecting surface creates a soft lighting effect, with relatively uniform illumination along the length of the optical fibre in contact with the sheet material.

Rather than using an optical fibre, which traditionally has a circular cross-section, an optical element comprising an optical film having a microstructured surface can also be used to create a diffuse, soft lighting effect, as described in U.S. 2005/0151119. Alternatively, an element comprising an optical film having a number of grooves or notches along its surface can be used to provide similar illumination effects to those of notched optical fibres.

As the length of optical element that can be illuminated by a single light source is relatively short, it is desirable to find a way to link individual elements together, and to provide a light source for each individual element such that the appearance of the overall lighting system is of one, continuous light. This may be done by providing a connector that enables both light injection and connects individual optical elements together.

One connector performing this function is that disclosed in U.S. Pat. No. 6,107,916. A light deflector element is provided to inject light from a remote light source into a light-release element. Light travels along the main body of the light deflector element until it reaches a notch in the end of the light deflector element, which has two angled surfaces that each direct light along a light-release element. However, this design does not provide a compact housing for both the light source and the joining of individual waveguides.

An alternative connector is disclosed in U.S. Pat. No. 6,510,267. Each waveguide connector has a top and a bottom portion that are joined together by screws or bolts, for example. These portions, when screwed together, form a channel in which an end of each of two waveguides sits, thus joining the waveguides together. To illuminate the waveguides, the waveguide connector may be provided with a cut out region into which a light source, such as a bulb, may be inserted. However, the bulb is essentially separate to the waveguide connector, and so again does not form a complete compact housing for both the light source and the joining of the waveguides.

The difficulty in using a somewhat bulky connector for connecting optical elements such as waveguides and providing illumination is that the range of lighting designs in which the optical elements can be used is somewhat restricted. A compact connector design enables an illumination system employing the connector to be far more flexible in application. In addition, the positions of the electrical connections relative to the connector are fixed by the position of the bulb holder and the requirement that the bulb is insertable into the connector at right angle to the optical fibre. This reduces the flexibility a designer has in joining and illuminating the optical elements.

The present invention aims to address these problems by providing a connector adapted for use in an illumination system comprising at least one optical element, the connector comprising: a housing dimensioned so that internally it retains at least one end portion of at least one optical element, and externally substantially follows the shape of the end portion(s) of the optical element(s), forming a join between them; a light source contained within the housing and positioned so as to illuminate the end portion(s) of at least one optical element; and electrical connection means adapted to connect the light source to an external power supply, the electrical connection means being moveable relative to the housing.

Such a connector provides a low-profile join between the ends of optical elements, and allows flexibility in the positioning of the housing and the electrical connection means, giving greater flexibility in the lighting designs achievable. The light source can be positioned between the ends of optical elements such that the overall appearance of the lighting design is not interrupted by the connector or light source, and a continuous line of light is observed by a viewer when illuminated.

The connector may also comprise a second light source, connectable to the electrical connection means, to illuminate either a second end of the optical element or a first end of a second optical element.

Preferably, the housing is in the form of a sleeve and encloses the end(s) of an optical element.

The electrical connection means may be provided on a flexible substrate, inserted into the housing.

The substrate may be an elongate flexible support having a base region at one end, and wherein the electrical connection means are mounted on the base region of the elongate flexible support. In this situation, the electrical connection means may comprise a metallic contact and a terminal portion of an electrical conductor stretching along the length of the elongate flexible support.

The metallic contact and the terminal portion may be positioned such that the light sources are connected parallel to the edges of the elongate flexible support. Alternatively, the metallic contact and the terminal portion may be positioned such that the light sources are connected perpendicular to the edges of the elongate flexible support. If this is the case, the electrical conductor preferably follows a reticulated path between the base portion and the main body of the elongate flexible support.

Alternatively, the electrical connection means may comprise two slideable contacts. These slideable contacts are preferably engageable with the housing. Preferably the housing comprises a U-shaped portion, and is dimensioned to fit within a guide rail intended to hold an optical element. The contacts may also be movable with respect to electrical conductors supplying power within a guide rail intended to hold an optical element.

Preferably, the housing is formed from a light diffusing material. Preferably, the light source is a light emitting diode (LED). Preferably, the optical element is an optical fibre.

The present invention also provides a light guide comprising: at least one optical element having two end portions; a connector as described above; wherein the connector joins the end portions of the optical element(s) to each other, such that no break in illumination is seen by a viewer when the light guide is illuminated.

The invention will now be described by way of example only, and with reference to the accompanying drawings, in which:

FIG. 6 is a diagrammatic exploded view of a light guide system comprising a connector in accordance with the second embodiment of the present invention.

The present invention adopts a different approach to that taken in the prior art with regard to the provision of a connector that joins the ends of at least one optical element together, and provides illumination for that/those optical element(s). By including a light source within a connector housing that is dimensioned so that internally it retains a first end of an optical element and externally substantially follows the shape of the optical element, a compact connector that gives the appearance of being part of the optical element when seem illuminated by a viewer can be made. This is because once the light source is positioned completely within the housing that connects together the ends of at least one optical element so as to illuminate the end(s) of the optical element(s), the size of the connector is essentially dictated by the size of the optical element. By providing electrical contacts that are moveable with respect to the housing, the contacts can be moved to any position required to power the light source regardless of the design of the lighting system. Consequently there is no restriction on the position of the light source due to its power supply, and a greater freedom of design is achieved.

Optical fibres generally comprise a core and a cladding layer, where light is transmitted along the core, and the cladding layer is provided to give protection from damage to the core layer. Typically, both the core and cladding layer are formed from glass, or both from a plastics material. Glass optical fibres tend to comprise a Germania-doped silica glass core, and although give excellent transmission properties, such fibres require special handling and installation, adding to their overall cost. Increasingly, optical fibres are formed from plastics materials as the mechanical flexibility of the fibre compared with glass materials is greatly increased, and the cost is considerably lower. Plastic optical fibres may typically comprise a PMMA (polymethylmethacrylate) or polystyrene core with a silicone resin cladding layer. Those suitable for use in the present invention may be of a polyurethane material, such as a two-component or thermoplastic polyurethane, or a silicone material. Optical fibres without a cladding layer may be used as an alternative to the core and cladding fibres described above. Again, such fibres are typically formed from a polyurethane material.

Figure 1:
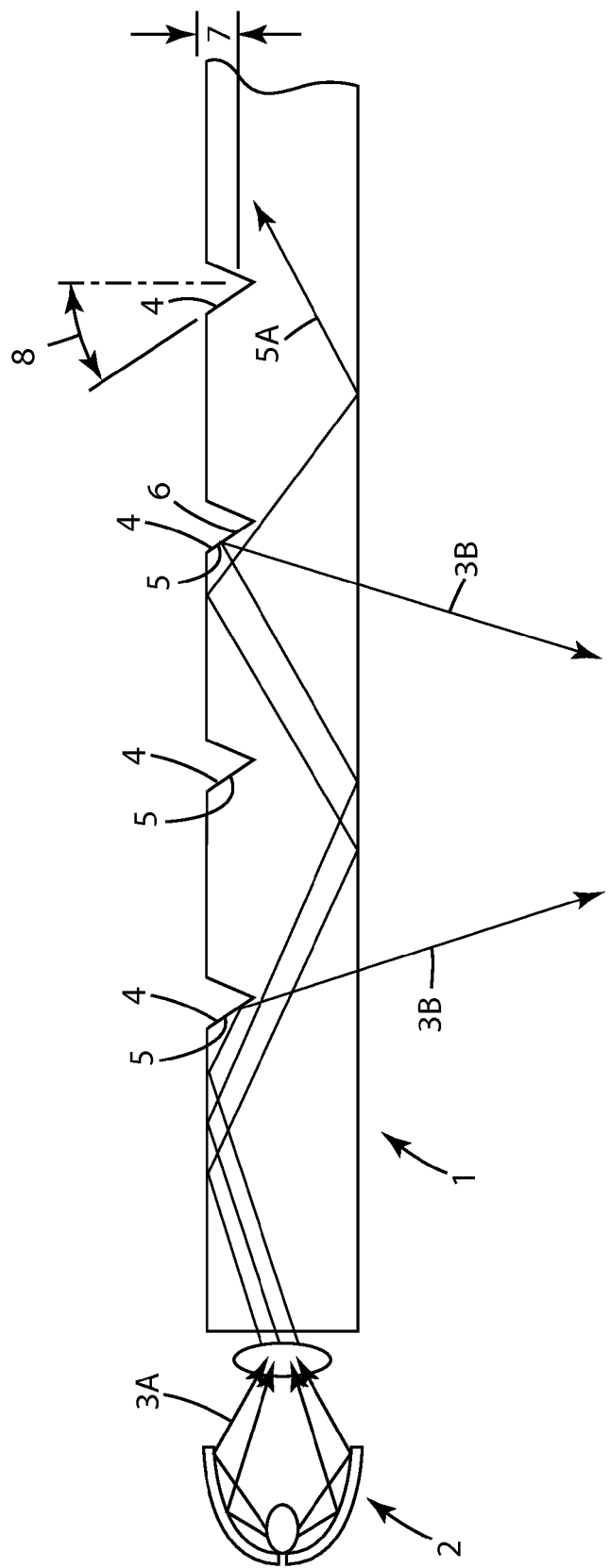
FIG. 1 is a diagrammatic longitudinal cross-section of a known optical fibre comprising light emission points along its length.

FIG. 1 is a diagrammatic longitudinal cross-section of a known optical fibre comprising light emission points along its length. As discussed above, the optical fibre 1 comprises a plastics material, and illumination of the fibre 1 is provided by a light source 2, such as an LED arranged with a parabolic reflector, with light focussed into the optical fibre 1 by means of a lens. A proportion of the light rays 3A emitted by the light source 2 propagate along the length of the optical fibre 1, which is the means by which information is carried down the optical fibre 1. A proportion of the light rays 3B emitted by the light source will exit the optical fibre 1, as described below.

Light emission points are provided at regular intervals along the length of the optical fibre 1. Such light emission points may be provided along the entire length of the optical fibre 1, or only along a portion of the length of the optical fibre 1. Each emission point is created by a "V"-shaped notch 4 cut into the surface of the optical fibre 1, aligned in a single row parallel with an axis running along the centre of the optical fibre. Each notch 4 has optically smooth surfaces 5, one of which is provided with a reflective coating 6 to aid in reflecting a proportion of the light rays 3B out of the optical fibre 1. Each notch 4 is cut to a particular depth 7, which impinges on the central region of the optical fibre 1. This creates a reflection surface within the optical fibre 1 that is not at the critical angle for total internal reflection, and therefore allows light rays 3B to be reflected out of the optical fibre 1 from the surface opposite to the notch 4, creating the light emission point. The proportion of the light rays 3B reflected out of the optical fibre 1 is determined by the angle 8 to the vertical at which each sloping surface of the "V"-shaped notch 4 lies. The reflective coating 6 may be omitted if desired.

Consequently the choice of notch depth and angle, density of notches 4 provided and their position along the length of the optical fibre 1 determines the amount of light emitted along the length of the optical fibre 1. This is discussed in more detail, including the effect of notch design, in EP 0 594 089 B1, to which reference should be made.

Figure 2:
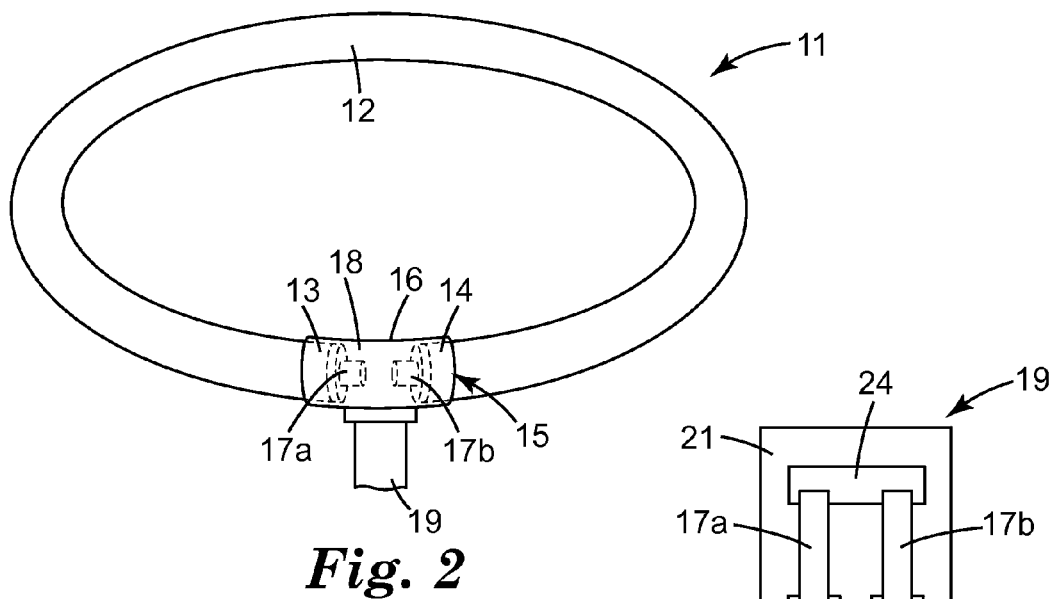
FIG. 2 is a diagrammatic perspective view of a ring light guide comprising a connector in accordance with a first embodiment of the present invention.

FIG. 2 is a diagrammatic perspective view of a ring light guide comprising a connector in accordance with a first embodiment of the present invention. The ring light guide 11 comprises a single optical fibre 12 bent around in a circular ring-shape, with the first 13 and second 14 ends of the optical fibre 12 being held within a connector 15. The connector 15 comprises a housing 16 having two light sources 17a, 17b contained therein, the housing being dimensioned to surround the first 13 and second 14 ends of the optical fibre 12. The light sources 17a, 17b are positioned within the housing 16 so as to illuminate the first 13 and second 14 ends of the optical fibre 12. The housing 15 is in the form of a sleeve 18 into which the first 13 and second 14 ends of the optical fibre 12 are inserted such that they are enclosed. The sleeve 18 is dimensioned that internally it retains the end portions of at least one optical element, and externally substantially follows the shape of the end portions of the optical fibre 12. The light sources 17a, 17b are carried on an electrical connection means 19 that is moveable with respect to the housing 16.

Figure 3:
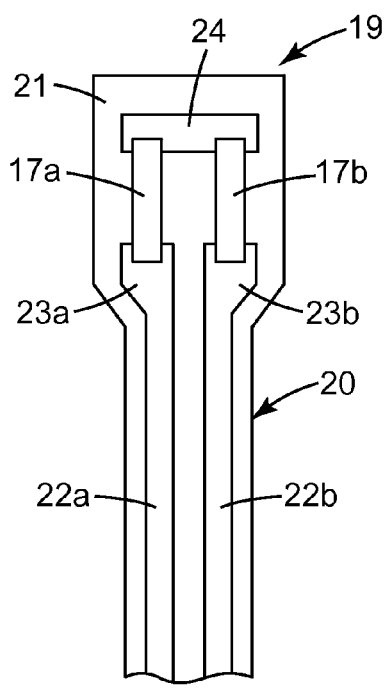
FIG. 3 is a diagrammatic plan view of a first electrical connection means used in a connector in accordance with the first embodiment of the present invention.

FIG. 3 is a diagrammatic plan view of a first electrical connection means used in a connector in accordance with the first embodiment of the present invention. The electrical connection means 19 comprises an elongate flexible support 20 having a generally rectangular base region 21 at one end. The base region 21 is adapted to be inserted into the housing 16 of the electrical connector 15. The elongate flexible support 20 supports two electrical conductors 22a, 22b that stretch along the length of the elongate flexible support 20 and terminate at the base region 21 in the form of terminal portions 23a, 23b. A second electrical connection means is provided in the form of a metallic contact 24, which is electrically isolated from the terminal portions 23a, 23b of the electrical conductors 22a, 22b.

The light sources 17a, 17b are light emitting diodes (LED) and are connected in series with the metallic contact 24 and the terminal portions 23a, 23b of the electrical conductors 22a, 22b stretching along the elongate flexible support 20. A first light source 17a is connected to the terminal portion 23a of the first 22a of the two electrical conductors, and a second light source 17b is connected to the terminal portion 23b of the second 22b of the two electrical conductors. With both light sources 17a, 17b connected to the metallic contact 24, this forms a series electrical connection. The terminals 23a, 23b of the electrical conductors 22a, 22b and the metallic contact 24 are positioned such that the light sources 17a, 17b are connected aligned parallel with the edges of the elongate flexible support 20.

Figure 4:
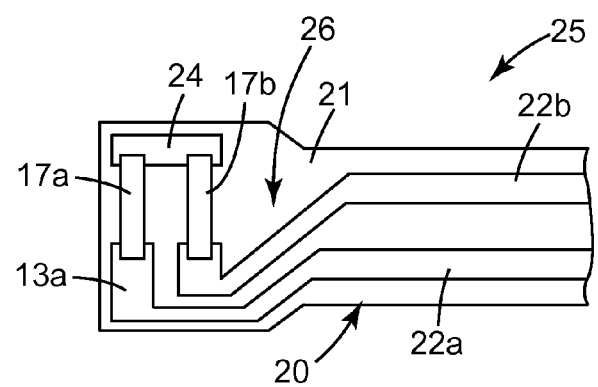
FIG. 4 is a diagrammatic plan view of a second electrical connection means used in a connector in accordance with the first embodiment of the present invention.

FIG. 4 is a diagrammatic plan view of a second electrical connection means used in a connector in accordance with the first embodiment of the present invention. This second electrical connection means 25 is constructed in the same manner as the first electrical connection means 19 described above, but with one major difference. The terminals 23a, 23b of the electrical conductors 22a, 22b and the metallic contact 24 are positioned such that the light sources 17a, 17b are connected aligned perpendicular to the edges of the elongate flexible support 20. To achieve this, the electrical conductors 22a, 22b carried by the elongate flexible support 20 take a reticulated path 26 between the base region 21 of the elongate flexible support 20 and the main body of the elongate flexible support 20. This means that the terminals 23a, 23b of the electrical conductors 22a, 22b are positioned along one edge of the base region 21 that lies parallel with the edge of the elongate flexible support 20, with the metallic contact 24 positioned adjacent to the opposite edge of the base region 21. This arrangement requires less space than that of the first electrical connection 19, and so the base region 21 can be smaller, leading to greater flexibility in the positioning of the electrical connections and consequently the light sources 17a, 17b, within the housing.

By providing the housing 16 of the electrical connector 15 with electrical connection means 19, 25 that are moveable with respect to the housing 16, the electrical connector 15 and consequently the light sources 17a, 17b can be placed wherever is desired and convenient with respect to the housing 16. This creates the appearance of a closed loop, such that the ring light guide 11 appears to be a continuous ring of light, and no interruption in the illumination in the region of the join between the end portions of the optical fibre 12 is seen by a viewer when the light guide is illuminated. For example, if it is desired to use the ring light guide 11 to illuminate a loudspeaker in a frame, the electrical connector 15 can be positioned anywhere within the housing to achieve illumination, regardless of how much space is provided for the optical element within the frame. Manoeuvring the elongate flexible support 20, and consequently the electrical connections and the light sources 17a, 17b within the housing is easy compared with creating an electrical connection between an external wire and a set of connections for a light source having a fixed position on a housing designed to hold the ends of an optical fibre in place.

The elongate flexible support 20 may be formed from a plastics material, preferably a thermoplastics material, and the electrical conductors 22a, 22b may be carried on the surface of the plastics material, for example, by being formed from a line printed using an electrically conductive ink, or embedded within the surface of the plastics material, for example, by embedding a wire, such as copper, or an electrically conductive metallic strip. The metallic contact 24 can be formed in the same way, for example, either by printing or by embedding an electrically conductive material within the plastics material.

A variety of LEDs may be used, or indeed, other light sources suitable for illuminating optical elements may be used instead. LEDs operating at a current in the range 10-20 mA are suitable, for example, a white LED operating at 3.4V and 20 mA gives a soft white ambient light, a yellow LED would operate at a lower voltage, for example 2.0V. Other colour LEDs or even multicoloured LEDs may be used instead. If LEDs with an operating current of more than 100 mA are used, additional heat soak measures must be taken to prevent the illumination system from overheating.

Although the above example is given in terms of an optical fibre, the connector in accordance with the first embodiment of the present invention may be used with other optical elements, such as optical films. The connector may also be used to join the ends of different optical elements together, for example, in a linear light guide, rather than in a ring light guide. Although the above examples are in terms of a ring light guide, it may be used with other light guide shapes. For example, the continuous light guide may be in the form of an ellipse, a square, a rectangle, a triangle or other geometrical shapes, all of which have in common that they are closed, that is, both ends of the optical fibre forming the shape are enclosed within the housing, creating a continuous closed perimeter.

The optical fibre 12 may be held within the sleeve 18 by a number of other means, for example, the material the sleeve 18 is formed from may have elastic properties, and if stretched over the optical fibre 12 hold the ends 13, 14 in place by gripping and/or compression, the sleeve 18 may clamp the ends of the optical fibre 12 in place by mechanical means, such as a ring or clip placed around the outside of the sleeve 18, or an interlock via a groove placed on the optical fibre 12 and a corresponding protrusion positioned on the sleeve 18 or vice versa, or an adhesive may be used. Alternatively, rather than use a pre-formed sleeve 18, the ends 13, 14 of the optical fibre may be placed in a mould and the sleeve 18 cast around them.

The visibility of the connector may be minimised by using suitable materials for forming the housing. Preferably, the material used to form the housing is a plastics material, and may have a degree of flexibility in order to make insertion or retention of the optical fibre easier. This may be by exhibiting the ability to stretch slightly to enclose the ends of the optical fibres. The material may be dark in colour, matching a background colour of a frame, or be a material that diffuses light, to minimise the occurrence of hot spots where the light sources are positioned within the housing. The material may be a thermoplastic material, such as ABS (acrylonitrile butadiene styrene), which may be transparent with a roughened surface, opaque (for example, a milky-white colour) or polished to reflect external ambient light. By minimising the distance between the ends of the optical fibre(s) and using such a light diffusing material to house the electrical connection, the appearance of a continuous line of light is achieved. This is particularly desirable for a ring light guide, as a continuous ring of light with no interruptions has a pleasing visual appearance.

Figure 5:
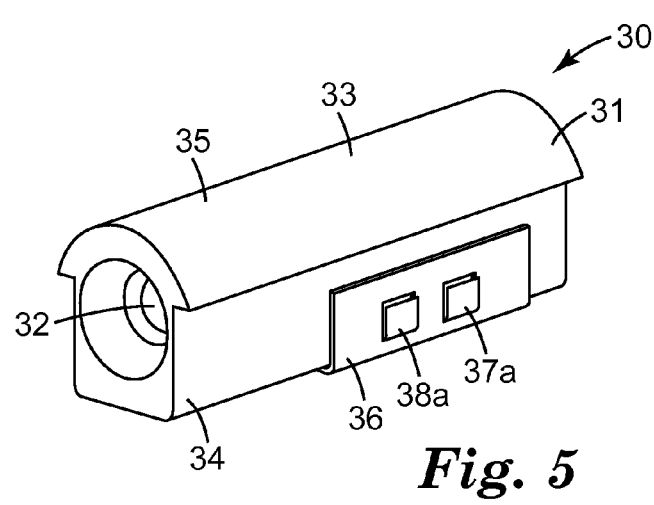
FIG. 5 is a diagrammatic perspective view of a connector in accordance with a second embodiment of the present invention.

FIG. 5 is a diagrammatic perspective view of a connector in accordance with a second embodiment of the present invention. The connector 30 comprises a housing 31 having a light source 32 contained therein, the housing being dimensioned to surround the end of an optical fibre (not shown). The light source 32 is positioned within the housing 31 so as to illuminate the end of the optical fibre. The housing 31 is in the form of a sleeve 33 into which the end of the optical fibre are inserted such that it is enclosed. The sleeve 33 is dimensioned so that internally it retains the end portions of at least one optical fibre, and externally substantially follows the shape of the end portions of the optical fibre(s), forming a join between them. In particular, the sleeve 33 is shaped so as to be received by a light guide rail (not shown), and so is provided with a square-cross section shape on its base portion 34, so as to fit into the square-channel shaped light guide rail, and a rounded shape on its upper portion 35. To ensure that the housing 31 sits flush with the light guide rail, such that the rail is not visible, the circular section has a greater diameter than the length of one of the sides of the square cross-section. This means that the upper portion 35 projects beyond the base portion 34, creating a mushroom-shape when viewed in cross-section. Typically for an optical fibre having a diameter of 7 mm, the stem of the mushroom-shape is 5 mm in width, with the dome of the mushroom-shape beginning at 4.5 mm from the bottom of the stem. The upper portion 35 sits below the top of the light guide rail, and in contact with ridges provided within the light guide rail as retention means. These are shown in more detail in FIG. 6 below. Internally, the housing 31 retains the end portions of at least one optical element, and externally substantially follows the shape of the end portions of the optical element(s), forming a join between them, such that no break in illumination in the region of the join is seen by a viewer when a light guide containing the connector and optical fibres is illuminated.

The electrical connection means 36 are formed by first 37a and second 37b slideable contacts (only one of which is visible in FIG. 5), each of which is moveable with respect to the housing 31 by being slideable along a side of the housing 31, as described below. Each slideable contact 37a, 37b is formed from a sheet metallic material, bent into a U-shape. One upward leg of the U-shape has two cut-out regions where a three-sided cut is made into the slideable contact 37a, 37b creating a spring contact 38a, 38b. In order for the slideable contacts 37a, 37b to form an electrical connection with the light source 32, a part of the housing 31 is left open in its base portion 35, so that it acts as a cover over the light guide, and is effectively U-shaped. The U-shaped slideable contacts 37a, 37b therefore fit over the downward legs of the U-shaped portion of the housing 31, and can be positioned at any point along this portion to give the desired electrical contact with the light source 32.

FIG. 6 is a diagrammatic exploded view of a light guide system comprising a connector in accordance with the second embodiment of the present invention. In addition to the connector 30 described above, a light guide rail 39 intended to hold an optical fibre is shown, having a square-shaped channel cross-section with a base 40 and two upstanding edges 41, 42, and two ridges 43, 44 running along the inner surfaces of the upstanding edges 41, 42 of the rail. These ridges 43, 44 are designed to receive the upper portion 35 of the housing 31 in a push fit. Two strip-like electrical conductors 45a, 45b are placed on the inner surface of the upstanding portion of the rail so as to be contacted by the slideable contacts 37a, 37b, forming an electrical connection between an external power supply (connected to the conductors 45a, 45b) and the light source 32. Not only are the slideable contacts 45a, 54b moveable with respect to the housing 31, they are moveable with respect to the conductors 45a, 45b supplying power within the guide rail 39. This makes the position of the connector 30 fully flexible, as its position is not limited to the point where an electrical supply enters the guide rail 39. An optical fibre 46, dimensioned to fit within the light guide rail 39 is also shown. This optical fibre 46 has the same characteristic cross-section as the connector housing 31: a square-shaped channel base portion and a rounded upper portion. As with the housing 31, the optical fibre 46 is dimensioned to create a push fit between the upper portion and the ridges 43, 44 running along the inside of the light guide rail 39.

In addition to the two electrical conductors 45a, 45b there may be a third strip like conductor 47 running along the base 40 of the light guide rail 39. This provides additional control for the light source 32 as well as heat management. Various other heat control devices, such as printed circuit board devices may be used instead. A second light source may also be included within the housing if two optical fibres are to be joined by the connector 30, also connected to the slideable contacts 37a, 37b. When two optical fibres are joined it may be desirable that they are positioned at non-180° angles to one another, for example, where a light guide rail is designed to turn a corner. In this situation, the housing may be "L"-shaped, with a light source positioned in each arm of the "L" shape. Further, if three optical fibres are to be joined, a three-armed housing may be used, with a light source in each arm, or a single light source at the join, as desired. This system may be used to accommodate up to six fibres being joined together, and up to six light sources. Preferably each of the light sources is soldered to the slideable contacts 37a, 37b, but other means, such as electrically conductive adhesive could be used if preferred. To accommodate lighting designs where the angle between optical fibres is variable, a hinge may be included in the centre of the housing to enable flexible positioning of the optical fibres.

It may be desirable to provide a locating feature such that the housing of the connector can be easily located within the light guide rail even when an operator cannot see the light guide rail itself Such a locating device may be a protrusion positioned on the base of the housing that is insertable into a corresponding hole or cavity in the light guide rail. The housing will not site properly within the light guide rail unless the protrusion forms a perfect mating fit with the hole/cavity provided. Such a protrusion may be cylindrical, hemispherical or cuboid, and fit into a correspondingly shaped hole/cavity.

A variety of LEDs may be used, or indeed, other light sources suitable for illuminating optical elements may be used instead. LEDs operating at a current in the range 10-20 mA are suitable, for example, a white LED operating at 3.4V and 20 mA gives a soft white ambient light, a yellow LED would operate at a lower voltage, for example 2.0V. Other colour LEDs or even multicoloured LEDs may be used instead. If LEDs with an operating current of more than 100 mA are used, additional heat soak measures must be taken to prevent the illumination system from overheating.

Although the above example is given in terms of an optical fibre, the connector in accordance with the first embodiment of the present invention may be used with other optical elements, such as optical films. Typically an optical fibre suitable for use with the present invention has a length of up to 1500 mm, depending on application and surroundings.

The visibility of the connector may be minimised by using suitable materials for forming the housing. Preferably, the material used to form the housing is a plastics material, and may have a degree of flexibility in order to make insertion or retention of the optical fibre easier. This may be by exhibiting the ability to stretch slightly to enclose the ends of the optical fibres. The material may be dark in colour, matching a background colour of a frame, or be a material that diffuses light, to minimise the occurrence of hot spots where the light sources are positioned within the housing. By minimising the distance between the ends of the optical fibre(s) and using such a light diffusing material to house the electrical connection, the appearance of a continuous line of light is achieved. Both the housing and the light guide rail may be made from any rigid plastic material that fulfils the mechanical requirements of the particular application. The plastic material may be a single component, a blend, or comprise a filler. Suitable materials include PBT (polybutylene terephthalate), PP (polypropylene), POM (polyoxymethylene), ABS (acrylonitrile butadiene styrene), PA (polyacrylate) and PPE/PS (polyphenylene ether/polystyrene).

The uses of flexible lighting designs incorporating the connectors in the first and second embodiments described above are various and widespread. Any use where the end portions op optical elements need to be joined together with no interruption in illumination can benefit from the present invention. For example, such designs may be used in the automotive (such as loudspeaker surrounds) and aeronautical sectors (emergency escape lighting in aeroplanes), and in buildings (lighting in shops, offices and domestic situations). This list is not exhaustive, but intended to illustrate the range of uses of both decorative and functional light designs incorporating connectors in accordance with the present invention.

The invention claimed is:

1. A light guide illumination system comprising:
   an optical light guide having opposite ends;
   a connector comprising a housing, at least one light source contained within the housing, and electrical contacts for connecting the light source to a power supply, with the connector being joined to one end of the optical light guide so as to supply light into the one end of the optical light guide such that there is no break in illumination at the joint between the connector and the optical light guide end, as seen by a viewer, when the optical light guide end is illuminated;
   a light guide rail comprising a base and two sides defining a channel having a length, with the optical light guide and the connector being held in and movable along the channel; and
   two strip-like electrical conductors disposed in the channel and being electrically connectable to a power supply, with one of the strip-like electrical conductors being on each side of the light guide rail and in contact with at least one of the electrical contacts, such that the connector is moveable along the light guide rail while each electrical contact remains in contact with one strip-like electrical conductor.

2. The light guide illumination system according to claim 1, wherein the connector and each optical light guide has a mushroom-shape cross-sectional.

3. The light guide illumination system according to claim 1, wherein the channel of the light guide rail is a square-shape channel, each optical light guide has a base portion with a square cross-section shape and an upper portion with a rounded cross-section shape, and the housing has a base portion with a square cross-section shape and an upper portion with a rounded cross-section shape, such that the upper portion of the housing and each optical light guide projects beyond its base portion so as to hide the light guide rail.

4. The light guide illumination system according to claim 1, wherein the light guide rail further comprises a ridge formed along each side and within the channel of the light guide rail, with the ridges retaining the connector and each optical guide within the light guide rail.

5. The light guide illumination system according to claim 1, wherein said at least one light source is at least two light sources, with one light source illuminating one optical light guide end and the other light source illuminating another optical light guide end.

6. The light guide illumination system according to claim 1, wherein each of the electrical contacts is moveable with respect to the housing.

7. The light guide illumination system according to claim 6, wherein the electrical contacts are slideable.

8. The light guide illumination system according to claim 7, wherein the electrical contacts are adapted to receive a portion of the housing.

9. The light guide illumination system according to claim 1, wherein the housing is formed from a light diffusing material.

10. The light guide illumination system according to claim 1, wherein the light source is at least one light emitting diode (LED).

11. The light guide illumination system according to claim 1, wherein each optical light guide is an optical fibre.

12. A light guide illumination system comprising:
   one optical light guide or two optical light guides, each optical light guide having opposite ends;
   a connector comprising a housing, at least one light source contained within the housing, and electrical contacts for connecting the light source to a power supply, with the connector supplying light into (a) each opposite end of the one optical light guide, or (b) one end of each of the two light guides, so as to join two optical light guide ends together such that there is no break in illumination at the joint between the connector and the two optical light guide ends, as seen by a viewer, when the two optical light guide ends are illuminated;

a light guide rail comprising a base and two sides defining a channel having a length, with each optical light guide and the connector being held in and movable along the channel; and two strip-like electrical conductors disposed in the channel and being electrically connectable to a power supply, with one of the strip-like electrical conductors being on each side of the light guide rail and in contact with at least one of the electrical contacts, such that the connector is moveable along the light guide rail while each electrical contact remains in contact with one strip-like electrical conductor.

13. The light guide illumination system according to claim 12, wherein the connector and each optical light guide has a mushroom-shape cross-sectional.

14. The light guide illumination system according to claim 12, wherein the channel of the light guide rail is a square-shape channel, each optical light guide has a base portion with a square cross-section shape and an upper portion with a rounded cross-section shape, and the housing has a base portion with a square cross-section shape and an upper portion with a rounded cross-section shape, such that the upper portion of the housing and each optical light guide projects beyond its base portion so as to hide the light guide rail.

15. The light guide illumination system according to claim 12, wherein the light guide rail further comprises a ridge formed along each side and within the channel of the light guide rail, with the ridges retaining the connector and each optical guide within the light guide rail.

16. The light guide illumination system according to claim 12, wherein said at least one light source is at least two light sources, with one light source illuminating one optical light guide end and the other light source illuminating another optical light guide end.

17. The light guide illumination system according to claim 12, wherein each of the electrical contacts is moveable with respect to the housing.

18. The light guide illumination system according to claim 17, wherein the electrical contacts are slideable.

19. The light guide illumination system according to claim 18, wherein the electrical contacts are adapted to receive a portion of the housing.

20. The light guide illumination system according to claim 12, wherein the housing is formed from a light diffusing material.

* * * * *

UNITED STATES PATENT AND TRADEMARK OFFICE
CERTIFICATE OF CORRECTION

PATENT NO. : 8,882,320 B2  Page 1 of 1
APPLICATION NO. : 13/496018
DATED : November 11, 2014
INVENTOR(S) : Joerg Purfuerst It is certified that error appears in the above-identified patent and that said Letters Patent is hereby corrected as shown below:

In the Specification

Column 9
Line 11, delete "itself Such" and insert -- itself. Such --

Signed and Sealed this
Fourteenth Day of April, 2015

Michelle K. Lee
*Director of the United States Patent and Trademark Office*